(12) United States Patent
Yamaguchi et al.

(10) Patent No.: US 8,649,662 B2
(45) Date of Patent: *Feb. 11, 2014

(54) CODED SIGNAL REPRODUCTION APPARATUS

(75) Inventors: Ryoji Yamaguchi, Katano (JP); Eiji Miyagoshi, Katano (JP)

(73) Assignee: Panasonic Corporation, Osaka (JP)

( * ) Notice: Subject to any disclaimer, the term of this patent is extended or adjusted under 35 U.S.C. 154(b) by 1159 days.

This patent is subject to a terminal disclaimer.

(21) Appl. No.: 12/486,279

(22) Filed: Jun. 17, 2009

(65) Prior Publication Data

US 2009/0257735 A1 Oct. 15, 2009

Related U.S. Application Data

(62) Division of application No. 09/380,187, filed as application No. PCT/JP98/06009 on Dec. 28, 1998, now Pat. No. 7,809,246.

(30) Foreign Application Priority Data

Dec. 26, 1997 (JP) .................... 9-360863

(51) Int. Cl.
   *H04N 9/80* (2006.01)
   *H04N 5/93* (2006.01)
(52) U.S. Cl.
   USPC .................. 386/248; 386/239; 386/353
(58) Field of Classification Search
   None
   See application file for complete search history.

(56) References Cited

U.S. PATENT DOCUMENTS

| 5,568,274 A | * | 10/1996 | Fujinami et al. ............. 386/330 |
| 5,596,420 A | | 1/1997 | Daum |
| 5,602,920 A | | 2/1997 | Bestler et al. |
| 5,621,840 A | | 4/1997 | Kawamura et al. |
| 5,633,686 A | | 5/1997 | Boden |
| 5,768,265 A | | 6/1998 | Toyohara |

(Continued)

FOREIGN PATENT DOCUMENTS

| EP | 0 269 974 | 6/1988 |
| JP | 5-110575 | 10/1991 |

(Continued)

OTHER PUBLICATIONS

International Search Report issued Mar. 23, 1999 in International Application No. PCT/JP98/06009.
Supplementary European Search Report issued Aug. 12, 2004 in European Application No. 98 96 1647.

*Primary Examiner* — Heather Jones
(74) *Attorney, Agent, or Firm* — Wenderoth, Lind & Ponack, L.L.P.

(57) ABSTRACT

A formatter 2s13 is provided and, when a code sequence which matches a part ('00') of the head of a predetermined code sequence detected by a start code prefix detection unit 2s3, is detected, the start code prefix detection unit 2s3 detects the residual part ('00', '00', '01', 'E0') of the detected predetermined code sequence to detect a pattern of ('00', '00', '00'), and the formatter 2s13 outputs one ('00'). After the boundary of packets is defined, amongst data which are not transferred to a decoding buffer 2s9, data corresponding to code sequences other than the code sequence ('00', '00', '01', 'E0') indicating the packet boundary are output to the decoding buffer 2s9. Therefore, when separating a coded and multiplexed signal, control of an input buffer reading control circuit 2s4 is simplified, and thereby the hardware scale is reduced, resulting in an inexpensive apparatus for reproducing a digital code sequence.

5 Claims, 12 Drawing Sheets

(56) References Cited

U.S. PATENT DOCUMENTS 6,172,989 B1 * 1/2001 Yanagihara et al. .......... 370/473
6,359,911 B1 * 3/2002 Movshovich et al. ........ 370/536
6,434,146 B1    8/2002 Movshovich et al.

FOREIGN PATENT DOCUMENTS

| | | | | |
|---|---|---|---|---|
| JP | 05110575 A | * | 4/1993 | ............ H04L 12/40 |
| JP | 11-68763 | | 3/1999 | |
| WO | 95/26595 | | 10/1995 | |

* cited by examiner status flag : flag indicating whether given PTS is effective or ineffective
PTS : PTS extracted from the packet header

US 8,649,662 B2

CODED SIGNAL REPRODUCTION APPARATUS

This application is a divisional of application Ser. No. 09/380,187 filed Nov. 9, 1999 now U.S. Pat. No. 7,809,246, which is the National Stage of International Application No. PCT/JP98/06009, filed Dec. 28, 1998.

TECHNOLOGICAL FIELD

The present invention relates to a coded signal reproduction apparatus and, more particularly, to simplification of a circuit structure of an apparatus which reproduces a digital code sequence in which audio, video, and other additional information are multiplexed, such as a video CD, a DVD, and a digital CS broadcasting.

BACKGROUND ART

In recent years, media for recording and transmitting digital-coded and multiplexed video signal, audio signal, and additional information signal such as subtitle information have spread rapidly, like a video CD, a DVD, and digital CS broadcasting. However, in order to spread apparatuses for reproducing the above-described coded and multiplexed digital signals for domestic use or the like, cost down of the reproduction apparatuses is indispensable. For this purpose, it is required to implement a demultiplexer for demultiplexing the multiplexed signal and a decoder for decoding the demultiplexed digital signals, with simple and compact circuit constructions.

By the way, in such digital media, a coding method defined by MPEG standard is generally used for video signals. On the other hand, for audio signals, coding methods other than the MPEG coding method are adopted in many cases. For multiplexing of coded video and audio data, a multiplexing method defined by the standard of MPEG system is adopted.

FIG. 3 shows examples of coded data of video information, audio information, and additional information which are multiplexed by using packets. The coded and multiplexed data are subjected to byte alignment. An audio signal and a video signal are respectively digital-coded by an encoder and then multiplexed in packet units by a multiplexer. At the head of each packet, a packet header H is assigned. The packet header H is composed of a synchronous signal S indicating the head of the packet (hereinafter, referred to as a packet start code prefix), an identifier I for deciding that the packet corresponds to one of packets of audio, video, and additional information, packet length information L indicating the length of the packet, a header length HL, video and audio synchronous reproduction information R and the like. After the packet header H, according to the kind of the packet, one of coded data CDP of the video signal, coded data CDS of the audio signal, and coded data CDA of the additional information is assigned. A part from the packet start code prefix to the header end is defined as a system layer, and a coded data part of video, audio, or additional information data after the header is defined as an elementary layer.

When coding a video signal, it is hierarchically coded, and a code sequence indicating the start of the hierarchy and a code sequence indicating the name of the hierarchy are used. The same code sequence is used for the code sequence indicating the start of the hierarchy and the above-mentioned start code prefix indicating the head of the packet.

Usually, since the prefix code of the packet start code appears in the multiplexed data sequence for every data unit indicated by the packet length included in the packet header information, usually, since the prefix code of the packet start code appears in the data sequence for every data unit indicated by the packet length included in the packet header information, there occurs no mixing of the packet start code prefix and the hierarchy start code of the coded video data.

However, in a packet including coded video data, in contrast with a packet including coded audio data, there is a case where multiplexed data whose packet length is not defined is input. This situation occurs, for example, in a multiplexed data sequence in which a transport packet used for digital CS broadcasting or the like is converted to a PES (Pakettaized Elementary Stream) packet. Hereinafter, a description will be given of the conventional manner of demultiplexing multiplexed data in the case where the packet length of coded video data is not defined.

FIG. 12 is a diagram showing the operation when reading coded video data, wherein a packet boundary of a video packet 1 and a video packet 2 is positioned between ('x3') and ('00'). A read pointer reads data of the video packet 1 in the order of x0, x1, x2, . . . , and the read data are sequentially transmitted to a decoding buffer. The presence of the packet boundary is recognized only when the pointer exceeds the packet boundary to reach 'E0' of the video packet 2 and thereby a pattern of ('00', '00', '01', 'E0') is detected. At this time, the data up to ('E0') of the video packet 2 have already been transmitted as effective data to the decoding buffer. So, the read pointer is returned to the packet boundary to perform reading again such that the data corresponding to the pattern of ('00', '00', '01', 'E0') are not transmitted to the decoding buffer because these data are originally not data to be decoded but data to be utilized in the system.

FIG. 4 shows two examples of the case where the hierarchy start code of the coded video data is separated between two packets, as patterns of mistaking the packet boundary.

Hereinafter, a description will be given of the packet boundary decision operation for the respective patterns shown in FIGS. 4(a) and 4(b).

Initially, the pattern of FIG. 4(a) will be described. In the pattern of FIG. 4(a), the hierarchy start code of the coded video data exists between ('00') and ('00', '01', '00') such that it is divided into two packets by the packet start code ('00', '00', '01', '0E') and the packet header.

In this case, in a start code prefix code detection unit which detects the prefix code of the start code, data is read from an input buffer, and the pattern of the start code prefix code is detected. At this time, the read address of the input buffer is an address α. The start code prefix code detection unit detects the pattern of ('00', '00', '01') and, thereafter, informs this to a start code discrimination unit which is positioned in the subsequent stage to activate the start code discrimination unit.

Next, the start code discrimination unit reads data of an address β, and decides whether this is the identifier ('B9'~'FF') indicating the head of the packet or the hierarchy start code ('00'~'B8') of the coded video data.

In the pattern of FIG. 4(a), since the data ('E0') of the address β is an identifier which indicates the start of the packet, the start code discrimination unit informs that the packet head is detected, to a header analysis unit, thereby activating the header analysis unit.

At this time, since data of address γ is a portion of the coded video data, it is necessary to connect this data to the rear of the following video packet data and transfer the data to the decoding buffer. Therefore, before activating the header analysis unit, in order to execute transfer of the data of address γ, it is necessary to perform an operation of setting the read address of the input buffer from the address β to the address γ which is prior to the address β, and transferring the data of address γ to the decoding buffer. Further, not only transferring the data of address γ, it is necessary to store the information that the data of address γ is a portion of the hierarchy start code of the coded video data.

In the case of FIG. 4(b), after the start code discrimination unit discriminates the identifier that indicates the packet start by the address β, in order to transfer the data of addresses γ and δ which are parts of the coded video data to the decoding buffer, the read address of the input buffer which has been in the address β should be returned to the address γ to control transferring the data of the addresses γ and δ to the decoding buffer. In this case, the pointer is moved longer distance than in the case shown in FIG. 4(a). Further, as in the case of FIG. 4(a), it is necessary to store the information that the data of the addresses γ and δ are parts of the hierarchy start code of the coded video data. The stored information about the possibility that the data ('00') of the address γ is a part of the hierarchy start code is used for detection of start codes in units of video reproduction of the coded data part of the next video packet.

In this way, since the length of the video packet is not defined, in the conventional coded signal reproduction apparatus, performed is complicated control of not, only advancing the reading pointer of the input buffer but also returning this at the packet boundary.

To be specific, in the conventional coded signal reproduction apparatus, since data transfer and data discrimination are performed simultaneously by using the read pointer of the same input buffer, the write pointer of the decoding buffer must be advanced excessively to a position where the input data can be identified as data of the system layer, when performing writing. Hence, the write pointer of the decoding buffer is advanced by using a decoding buffer write pointer correction unit. Further, when the input data is data of the system layer, the start code must be detected again, and so the pointer value is once returned. To prevent the input data from being broken by this, an input buffer read pointer correction unit is provided to correct the pointer. Further, to prevent the data input to the input buffer from being broken, an input buffer protection unit is provided to store the input data, whereby the input data is protected. Therefore, the construction and control of the apparatus are complicated.

Secondary, in reproducing a coded and multiplexed signal, there is a case where header information of packets used for multiplexing must be used. As information required for this, audio and video synchronous reproduction information (PTS) and the like are raised. In many cases, the reproduction information is given in fundamental units of audio and video reproduction. Further, the reproduction information includes, besides the PTS, information indicating the presence or absence of the PTS for each reproduction fundamental unit data included in each packet. In the coded signal decoding apparatus, when the reproduction information is used for reproduction, it is necessary to store the reproduction information by any means. For example, it is thought that the reproduction information is temporarily stored in a memory inside the coded signal decoding apparatus. However, when the reproduction information includes a lot of audio and video reproduction fundamental units to be input to the decoding buffer in a unit time, since the corresponding synchronous reproduction information increases in proportion to them, hardware required as a memory used for storage increases in size, resulting in increased chip area when it is implemented by an LSI.

Thirdly, the reproduction apparatus for video and audio signals employs the pipeline structure in many cases. In the pipeline, a data bus width is defined, and coded data are transferred with the defined bus width to be decoded, but there will occur a case where the last part of the coded data is shorter than the data bus width. In order to control data transfer of the data shorter than the data bus width, it is necessary to perform data transfer control different from the ordinary data transfer, i.e., data transfer control must be performed in the processing pipeline which enables access in 1-byte units, resulting in complicated hardware.

Since the conventional coded signal reproduction apparatus is constructed as described above, in the patterns of FIGS. 4(a) and 4(b), a complicated control circuit which performs control such that the read address of the input buffer at the packet boundary is advanced and then returned back, is required. Further, depending on the data, to store the reproduction information included in the packet header part becomes a factor of increase in the hardware resources such as memories.

The present invention is made to solve the above-mentioned problems, and it is an object of the present invention to provide a coded signal reproduction apparatus which can reproduce a digital signal with less hardware resources, without requiring complicated control.

DISCLOSURE OF THE INVENTION

As described above, a coded signal reproduction apparatus of the present invention is provided with a matching status information output means for detecting the matching status of a code which is input for every predetermined bit with a prefix code of a packet start code, and outputting matching status information of a head part of the packet start code; and data format means for outputting predetermined data in accordance with the matching status information. Therefore, it is possible to dispense with complicated address control to return a read pointer to a position before the packet boundary when the predetermined data is output according to the matching status of the code sequence indicating the packet boundary and thereby the packet boundary is recognized. Thereby, the hardware scale can be reduced, and an apparatus for reproducing a digital code sequence can be provided at a low price.

Further, the coded signal reproduction apparatus of the present invention includes header analysis means for analyzing the header of the packet to output reproduction information when the input code sequence is coded video data, and the data format means inserts the reproduction information together with information indicating effectiveness of the reproduction information, in a predetermined position in the coded video data. Since the formatter adds the reproduction information included in the packet header to the coded video data, the scale of hardware such as a memory required for holding the reproduction information can be minimized, whereby an apparatus for reproducing a digital code sequence can be provided at a low price.

Further, the coded signal reproduction apparatus of the present invention includes end code sequence detection means for detecting, from code sequences of coded data, a code sequence indicating the end of the coded data; and formatter means for adding a predetermined number of pseudo data to the rear of the code sequence indicating the end of the coded data so that the data bus width of pipeline transfer including the end of the coded data becomes equal to the bus width of pipeline transfer including other data, when a code sequence indicating the end of the code data is detected by the end code sequence detection means. Therefore, data transfer inside the pipeline in the reproduction apparatus can be performed to the end of coded data which is shorter than the data bus width in the pipeline, without requiring complicated transfer control, whereby an apparatus for reproducing a digital code sequence can be provided at a low price.

Further, the coded signal reproduction apparatus of the present invention inserts a specific code sequence in the last packet of the packet sequence before adding the pseudo data. Therefore, even when a code sequence indicating the end of the coded data does not exist, addition of the predetermined number of pseudo data can be performed reliably.

PREFERRED EMBODIMENTS TO IMPLEMENT THE INVENTION

Embodiment 1

Figure 9:
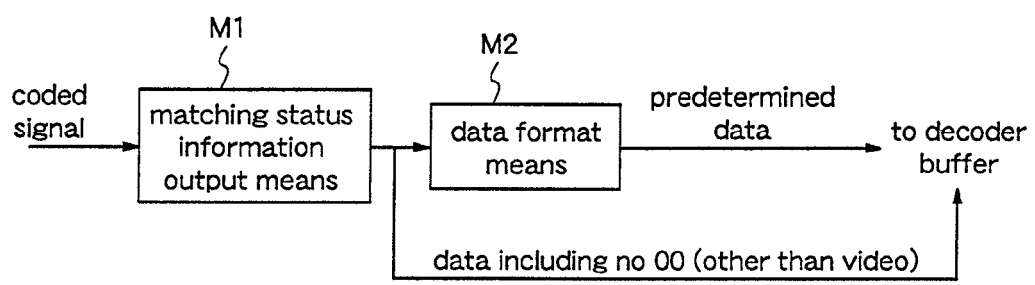
FIG. 9 is a block diagram illustrating the conceptual structure of a coded signal decoding apparatus according to the present invention.

Hereinafter, a coded signal reproduction apparatus according to a first embodiment of the present invention will be described with reference to the figures. FIG. 9 is a block diagram illustrating the conceptual structure of a coded signal reproduction apparatus of the present invention. In FIG. 9, M1 is a matching status information output means which receives a coded signal, collates input codes with predetermined codes, and outputs matching status information. M2 is a data format means which receives the matching status information. Especially when ('00') appears in the codes, M2 generates predetermined data according to this and outputs the data to the decoding buffer. Further, with respect to data (excluding a video signal) in the case where ('00') does not appear in the coded signal, the data format means M2 does not participate in this, and the data is transferred to the decoding buffer.

Figure 1:
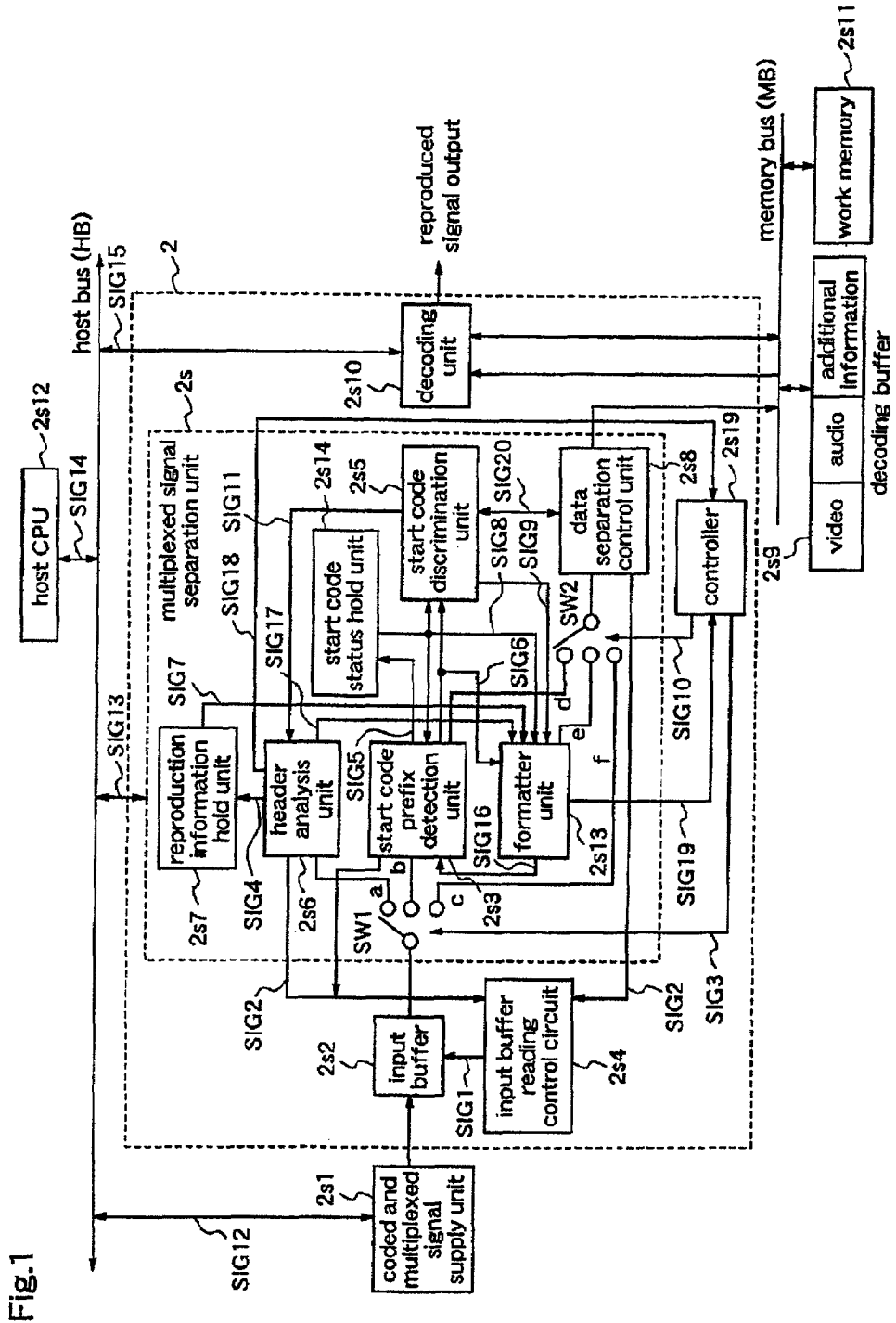
FIG. 1 is a block diagram illustrating the structure of a coded signal decoding apparatus according to first to third embodiments of the present invention.

FIG. 1 is a block diagram illustrating the detailed structure of the coded signal reproduction apparatus. This corresponds to the invention of Claim 1 of this application, providing simplified structure and control as compared with the conventional apparatus.

In FIG. 1, $2s1$ is a coded and multiplexed signal supply unit which supplies a coded and multiplexed signal to the coded and multiplexed signal separation apparatus, and this corresponds to a part before a decoder of a player for a video CD or DVD or a digital CS tuner. $2s2$ is an input buffer which receives the output from the coded and multiplexed signal supply unit $2s1$, and it is constituted by, for example, a ring buffer. $2s4$ is an input buffer reading control circuit which controls read addresses by giving a reading control signal (SIG1) to the input buffer $2s2$, thereby performing reading control. SW1 is a switch which connects the output from the input buffer $2s2$ with one of three terminals a, b and c. $2s3$ is a start code prefix detection unit which receives a signal when the switch SW1 is placed on the terminal b, and detects a start code prefix (a prefix code) included in a packet. This unit $2s3$ detects a desired code sequence from code sequences in which data are multiplexed, by using a synchronous signal comprising a start code prefix and a packet identifier, and a packet length. Further, $2s5$ is a start code discrimination unit which is activated by a status signal (SIG8) output from a start code status hold unit $2s14$, receives a start code value of one byte (SIG6) which is an output signal from the start code prefix detection unit $2s3$, and decides that the start code is included in one of the packets of video signal, audio signal, and additional information. $2s6$ is a header analysis unit which analyzes a header on receipt of a header analysis start signal (SIG11) as an output signal from the start code discrimination unit $2s5$, and a signal output from the input buffer $2s2$ when discrimination of the start code is ended and the switch SW1 is placed at the terminal a. The analysis unit $2s6$ performs analysis of codes which follow the synchronous signal.

Further, $2s7$ is a reproduction information hold unit which receives a reproduction signal (SIG4) as an output signal from the header analysis unit $2s6$, and holds reproduction information. $2s14$ is a start code status hold unit which receives a status updation signal (SIG5) as an output signal from the start code prefix detection unit $2s3$, and holds a status which is updated according to the signal. Further, $2s13$ is a formatter which receives a reproduction information status signal (SIG17) as an output signal from the header analysis unit $2s6$, a formatter activation signal (SIG9) as an output signal from the start code discrimination unit $2s5$, a 1-byte signal (SIG6) as an output signal from the start code prefix detection unit $2s3$, reproduction information (PTS) (SIG7) as an output signal from the reproduction information hold unit $2s7$, and a status signal (SIG8) as an output signal from the start code status hold unit $2s14$. When a specific numerical sequence is input to the formatter according to these signals, the formatter outputs the corresponding numeric sequence. The formatter generates data based on information output from the matching status information output means which comprises the start code prefix detection unit $2s3$, the start code status hold unit $2s14$, and the start code discrimination unit $2s5$, and inserts the data sequence in a predetermined position of coded video data.

SW2 is a switch which selects a signal output from one of the start code prefix detection unit $2s3$, the formatter $2s13$, and the terminal c of the switch SW1, and outputs the signal. $2s8$ is a data separation control unit which receives a post signal (SIG20) output from the start code discrimination unit $2s5$, and a signal output from the input buffer $2s2$ when the switches SW1 and SW2 are placed at the terminals c and f, respectively, and recognizes the boundary of packets to perform data separation control. When data transfer has ended, the data separation control unit 2s8 posts it to the start code discrimination unit 2s5 by using the post signal (SIG20). 2s19 is a controller which performs switching control for switches SW1 and SW2 on receipt of a format start/end signal (SIG19) output from the formatter 2s13 and a header end signal (SIG18) output from the header analysis unit 2s6, and outputs switching control signals (SIG3, SIG10) for controlling the respective switches.

Further, 2s is a multiplexed signal separation unit comprising the above-mentioned switch SW1, switch SW2, start code prefix detection unit 2s3, start code discrimination unit 2s5, header analysis unit 2s6, reproduction information hold unit 2s7, data separation control unit 2s8, formatter 2s13, and start code status hold unit 2s14.

Further, 2s10 is a decoding unit which takes the reproduction information held in the reproduction information hold unit 2s7 as a host control signal C(SIG15) through a host bus (HB), and decodes the signal output from the data separation control unit 2s8. 2s9 is a decoding buffer which receives the output signal from the data separation control unit 2s8 and holds this signal to supply it to the decoding unit 2s10. The decoding buffer 2s9 has separated storage areas for video, audio, and additional information, respectively, and allocates the data output from the data separation control unit 2s8 to a predetermined area to store the data in the area. 2s11 is a work memory to be used when the decoding unit 2s10 performs decoding operation. 2s12 is a host CPU which controls exchange of a host control signal B (SIG14) for performing initial setting or reset of the decoding unit 2s10. The host bus HB of the host CPU is connected with the reproduction information hold unit 2s7 and the decoding unit 2s10. Further, the host CPU outputs a supply control signal (SIG12) for controlling data supply operation of the coded and multiplexed signal supply unit 2s1.

A coded signal reproduction apparatus 2 comprises the above-mentioned constituents except the coded and multiplexed signal supply unit 2s1, the host bus HB, the host CPU 2s12, the controller 2s19, the decoding buffer 2s9 and the work memory 2s11, i.e., it comprises the input buffer 2s2, the input buffer reading control circuit 2s4, the switch SW1, the switch SW2, the start code prefix detection unit 2s3, the start code discrimination unit 2s5, the header analysis unit 2s6, the reproduction information hold unit 2s7, the data separation control unit 2s8, the formatter 2s13, the start code status hold unit 2s14, the decoding buffer 2s9, the decoding unit 2s10, the work memory 2s11.

Further, in the above-mentioned construction, the decoding buffer 2s9 and the work memory 2s11 are external memories implemented by SDRAMs or the like, and these are generally constituted on chips different from an LSI chip which implements other constituents.

Further, in the above-mentioned construction, the start code prefix detection unit 2s3, the start code discrimination unit 2s5, and the start code status hold unit 2s14 implement a matching status information output means M1, and the formatter 2s13 implements a data format means M2. Further, the header analysis unit 2s6 and the reproduction information hold unit 2s7 implement a header analysis means.

Next, the operation will be described. A coded and multiplexed data sequence supplied from the coded and multiplexed signal supply unit 2s1 is once stored in the input buffer 2s2. At this time, under control of the controller 2s19, initially the switch SW1 is connected to the contact b. The multiplexed data sequence stored in the input buffer 2s2 is output byte by byte toward the start code prefix detection unit 2s3 under control of the input buffer reading control circuit 2s4. The start code prefix detection unit 2s3 and the start code status hold unit 2s14 detect a packet start code which is a head code of packetized data. Then, the start code prefix detection unit 2s3 activates the start code discrimination unit 2s5 by using status information (SIG8) from the start code status hold unit 2s14 which is described later.

The start code discrimination unit 2s5 decides the kind of the input packet by using that a video packet, an audio packet, and an additional information packet have different packet identifiers. When the packet identifier which follows the start code prefix code is an identifier which indicates a desired data sequence to be reproduced, the start code discrimination unit 2s5 posts that the input packet is an effective packet to the header analysis unit 2s6. Whether the packet is an effective packet or an ineffective packet, the start code discrimination unit 2s5 activates the header analysis unit 2s6.

When the start code discrimination unit 2s5 decides that the input packet is an audio packet or an additional information packet, since analysis of the start code is not necessary, the controller 2s19 places the switch SW1 on the contact c and the switch SW2 on the contact f, whereby the start code discrimination unit 2s5 outputs the output packet from the input buffer 2s2 directly to the data separation control unit 2s8.

Data separation control unit 2s8 controls data transfer of this audio packet or additional information packet to the decoding buffer 2s9.

The decoding unit 2s10 decodes the audio packet or additional information packet stored in the decoding buffer 2s9, by using an internal audio decoder or additional information decoder, temporarily stores a decoded signal in the work memory 2s11, and reads the decoded signal from the work memory 2s11 to output it to the outside as a reproduced signal.

Figure 2:
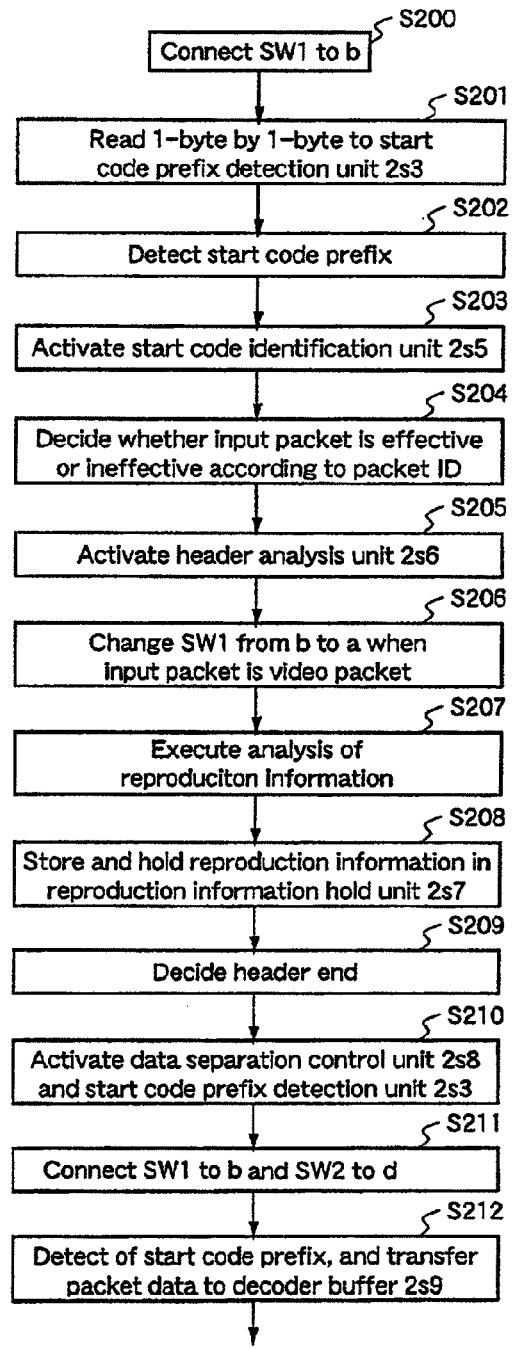
FIG. 2 is a flowchart for explaining the operation of the coded signal decoding apparatus according to the first embodiment.
Figure 3:
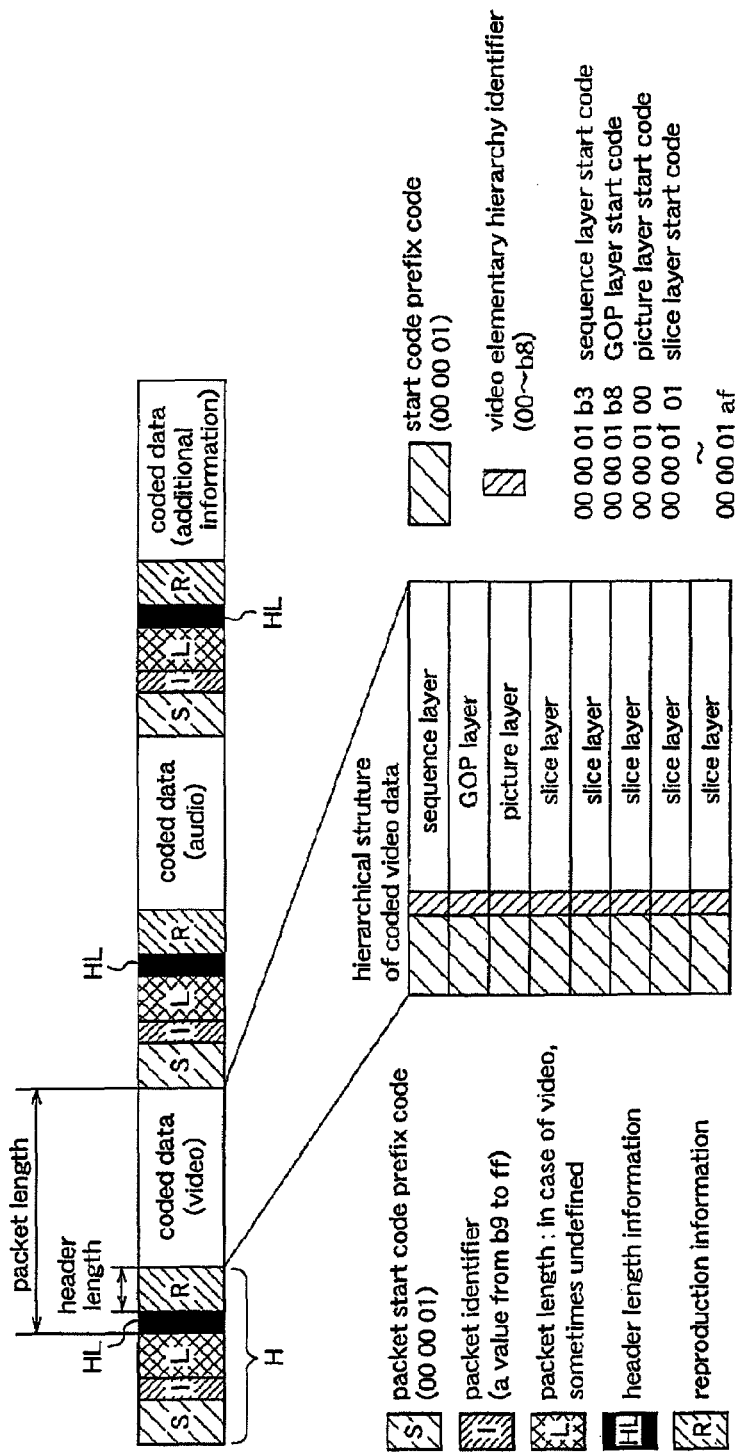
FIG. 3 is a diagram for explaining the structure of a multiplexed signal.

Next, a description will be given of the case wherein the input packet is a video packet, having emphasis on the functions of the formatter 2s13 and the start code status hold unit 2s14, with reference to the flowchart of FIG. 2.

As described above, under control of the controller 2s19, initially the switch SW1 is connected to the contact b (step S200) while the switch SW2 is not connected to any contact. The multiplexed data sequence stored in the input buffer 2s2 is output byte by byte toward the start code prefix detection unit 2s3 under control of the input buffer reading control circuit 2s4 (step S201). The matching status information output means M1 including the start code prefix detection unit 2s3 and the start code status hold unit 2s14 detects a packet start code prefix which is a head code of packetized data (step S202), and posts that ('00', '00', '01') is input, to the start code status hold unit 2s14 by using the status updation signal SIG5. After activating the start code discrimination unit 2s5 by using the status information (SIG8), the start code prefix detection unit 2s3 reads 1 byte from the input buffer 2s2, and posts this to the start code discrimination unit 2s5 by using a 1-byte signal SIG6 (step S203).

Next, in step S204, the start code discrimination unit 2s5 decides the kind of the input packet by using that the packet identifier differs according to that the input packet is a video packet, or an audio packet, or an additional information packet. When the packet identifier which follows the start code prefix code is an identifier which indicates a desired data sequence to be reproduced, the start code discrimination unit 2s5 posts that the input packet is an effective packet to the header analysis unit 2s6. Further, whether the packet is an effective packet or an ineffective packet, the start code discrimination unit 2s5 activates the header analysis unit 2s6 in step S205. The decision as to whether the input packet is an effective packet to be reproduced or an ineffective packet not to be reproduced is made by collating the packet with the identifier of an reproduced packet which is set in the start code discrimination unit 2s5, by the host CPU, according to SIG13 and SIG14 through the host bus (HB), when reproduction is started.

When the start code discrimination unit 2s5 decides that the input packet is a video packet, the controller 2s19 changes the switch SW1 from the contact b to the contact a (step S206), and outputs the video packet to the header analysis unit 2s6. At this time, the switch SW2 is connected to none of the contacts.

The header analysis unit 2s6 receives the packet from the input buffer 2s2, and analyzes the packet length, the reproduction information used at reproduction and the like, which are included in the packet header (step S207), and stores the reproduction information in the reproduction information hold unit 2s7 (step S208). Further, the reproduction information includes information for synchronizing audio with video (PTS), a flag indicating presence information of the PTS for each reproduction fundamental unit data, included in each packet.

Furthermore, the header analysis unit 2s6 decides the end of the header based on header information (step S209). While performing the processes of video data, the controller 2s19 controls the switch SW2 so that it is connected to none of the contacts, and activates the data separation control unit 2s8 and the start code prefix detection unit 2s3 (step S210). The data separation control unit 2s8 controls data transfer to the decoding buffer 2s9 according to data separation information possessed by the header analysis unit 2s6.

The coded data of video stored in the decoding buffer 2s9 is decoded by the video decoder in the decoding unit 2s10, like the coded data of audio or additional information, to be output as a reproduced signal. The decoding unit 2s10 performs the decoding process with the work memory 2s11. At this time, it performs the decoding operation so that the coded video data is synchronized with the coded audio data, by using the reproduction information held by the reproduction information hold unit 2s7.

Next, the header analysis part 2s6 performs analysis of the header. When it becomes clear that the data included in the input packet is video data, the controller 2s19 controls the switches SW1 and SW2 to send the packet containing video data to the terminals b and d (step S211). After the end of the header, the controller 2s19 sends the packet containing video data through the terminal b of the switch SW1 to the start code prefix detection unit 2s3 while transferring the coded video data area to the decoding buffer 2s9 side (step S212). Then, for detecting the start code at the head of the next packet, the controller 2s19 activates the start code prefix detection unit 2s3, and detects the start code of the next packet to separate the data of the next packet.

However, there is a possibility that the hierarchy start code ('00', '00', '01', '00'~'B8') included in the hierarchically coded video sequence is confused with the packet start code ('00', '00', '02', 'B9'~'FF') because these codes have similar patterns, and therefore the packet boundary is mistaken.

Figure 4:
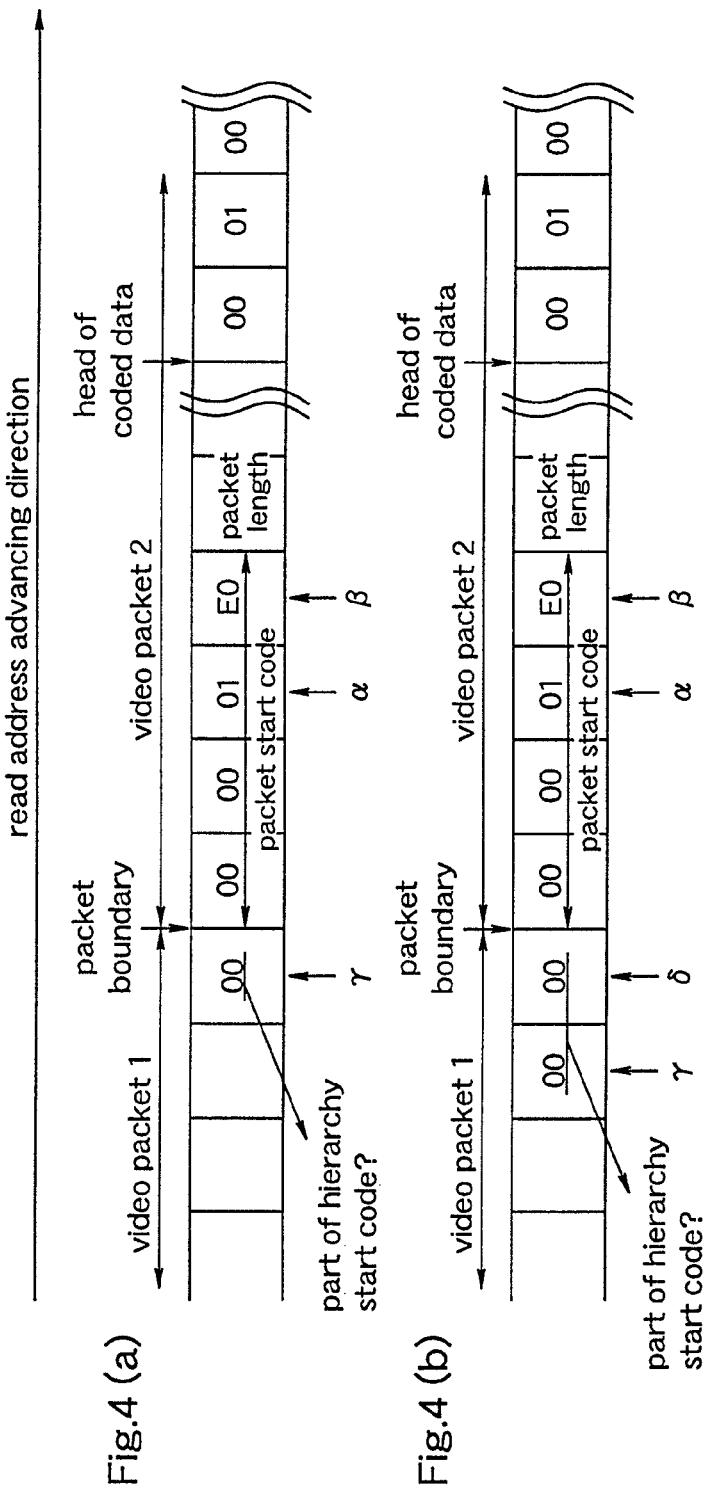
FIG. 4 is a diagram for explaining a multiplexed signal in which a packet boundary in a decoding buffer is easily mistaken.
Figure 10:
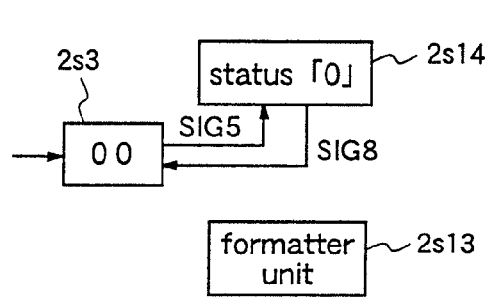
FIG. 10 is a flowchart for explaining the operation of the coded signal decoding apparatus of the present invention in the case where an input packet is a video packet, having emphasis on a formatter and a start code state storage unit.
Figure 10:
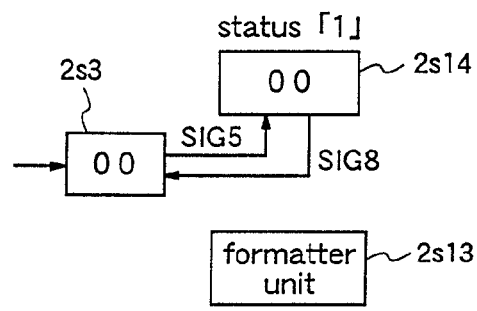
Figure 10:
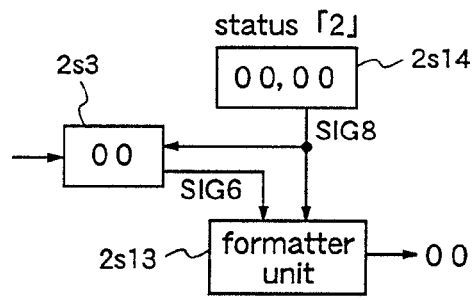
Figure 10:
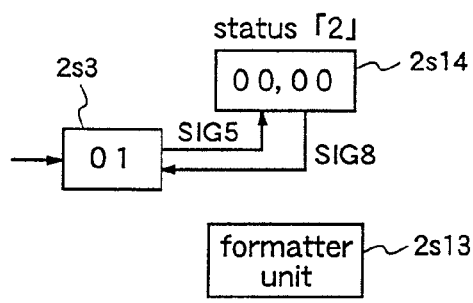
Figure 10:
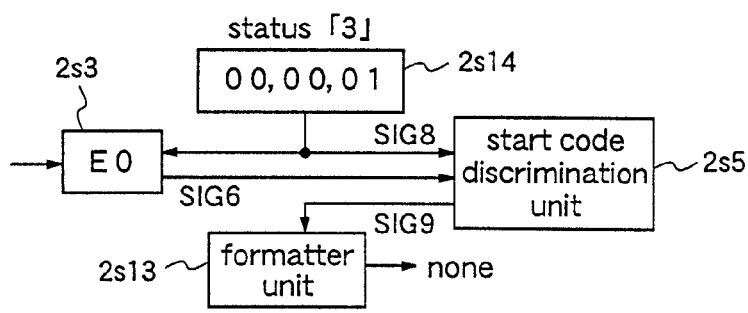

Hereinafter, a description will be given of the operation of this embodiment in two examples in the case where the hierarchy start code of the coded video data is divided between two packets, as patterns of easily mistaking the packet boundary, with reference to FIG. 4 and FIG. 10.

Initially, as shown in FIG. 10a, ('00') is read by 1 byte to the start code prefix detection unit 2s3. The start code prefix detection unit 2s3 knows that the present status is "0" by the status signal SIG8, and posts the status where one ('00') is input, to the start code status hold unit 2s14 by using the status updation signal SIG5. The start code status hold unit 2s14 updates the status from "0" to "1" to indicate the status where ('00') is held as historical information of head code matching status.

Next, as shown in FIG. 10(b), ('00') is read by 1 byte to the start code prefix detection unit 2s3. The start code prefix detection unit 2s3 knows that the present status is "1" by the status signal SIG8, and posts the status where ('00') is input, to the start code status hold unit 2s14 by using the status updation signal SIG5. To this point, the status where two pieces of ('00') are continuously input has been posted to the start code status hold unit 2s14, and the start code status hold unit 2s14 updates the status from "1" to "2" to indicate the status where it holds the two continuous ('00') as historical information.

Next, as shown in FIG. 10(c), ('00') is read by 1 byte to the start code prefix detection unit 2s3. The start code prefix detection unit 2s3 knows that the present status is "2" by the status signal SIG8, and posts the 1-byte signal SIG6 indicating ('00') to the formatter 2s13. Further, the detection unit 2s3 activates the formatter 2s13 according to the status signal SIG8 indicating the status "2" from the start code status hold unit 2s14.

Thereafter, as shown in FIG. 10(d), ('01') is read to the start code prefix detection unit 2s3. The start code prefix detection unit 2s3 knows that the present status is "2" by the status signal SIG8, and posts the status where ('01') is input, to the start code status hold unit 2s14 by using the status updation signal SIG5. To this point, the status where ('00', '00', '01') are input has been posted to the start code status hold unit 2s14, and the start code status hold unit 2s14 updates the status from "2" to "3" to indicate the status where it holds ('00', '00', '01'), as historical information.

Next, as shown in FIG. 10(e), ('E0') is read to the start code prefix detection unit 2s3. The start code prefix detection unit 2s3 knows that the present status is "3" according to the status signal SIG8, and posts the status where ('E0') is input, to the start code discrimination unit 2s5 by using the 1-byte signal SIG6. Further, the start code status hold unit 2s14 posts the present status "3" to the start code discrimination unit 2s5 by using the status signal SIG8.

Figure 11:
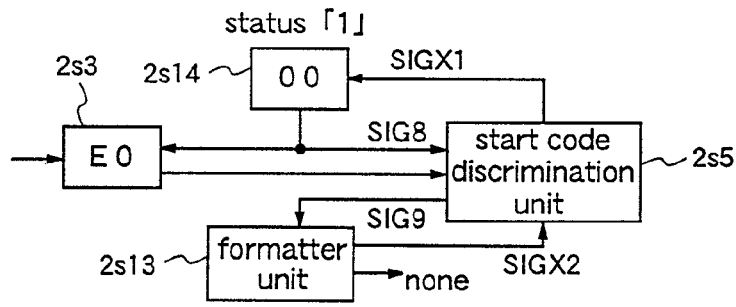
FIG. 11 is a flowchart for further explaining the operation of the coded signal decoding apparatus of the present invention in the case where an input packet is a video packet, having emphasis on a formatter and a start code state storage unit.
Figure 11:
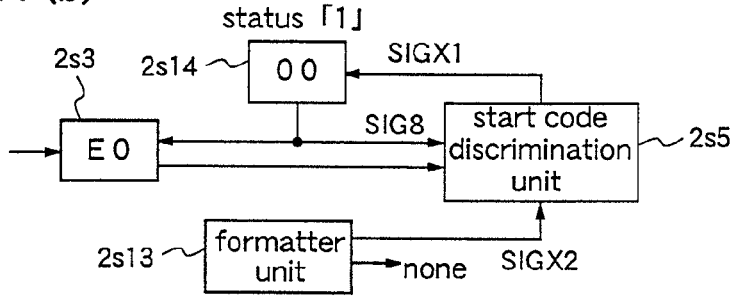
Figure 11:
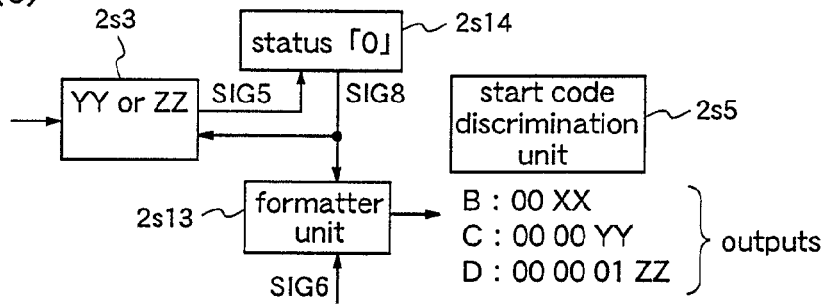
Figure 11:
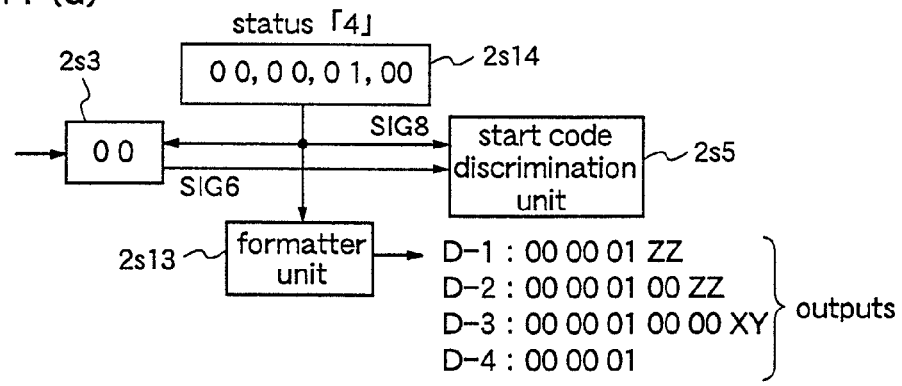
Figure 12:
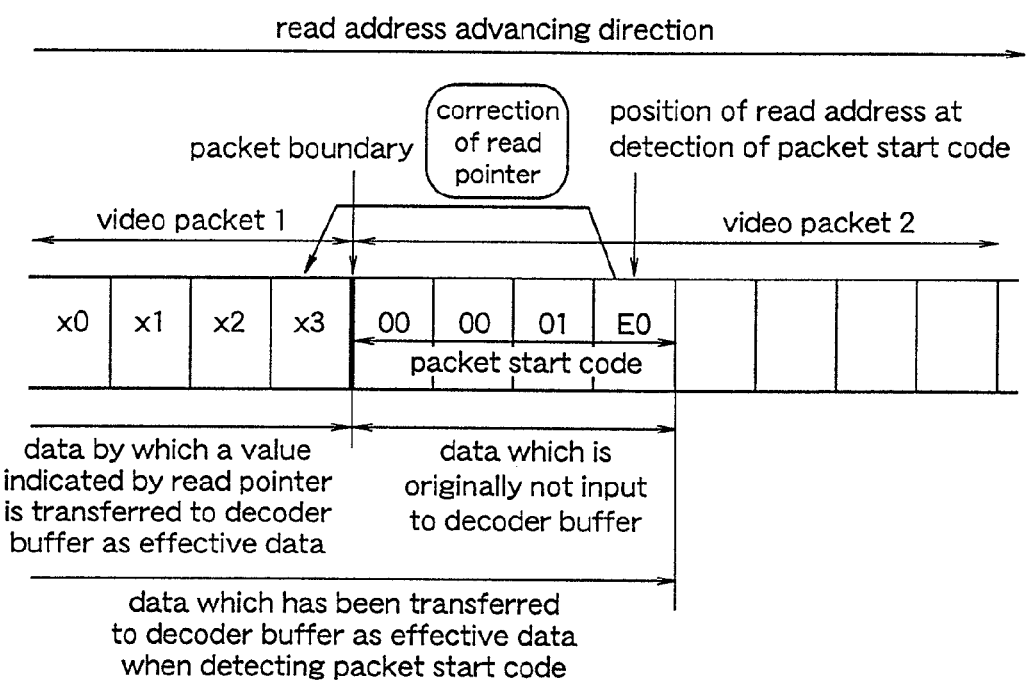
FIG. 12 is a diagram for explaining coded video data reading operation by a conventional coded signal reproduction apparatus.

On receipt of the 1-byte signal SIG6, the start code discrimination unit 2s6 decides that the input 1-byte signal SIG6 is ('00'), or a value from ('00') to ('B8'), or a value from ('B9') to ('ff'). In this embodiment, the input 1-byte signal SIG6 is ('E0'). Since the status is "3" and the 1-byte signal SIG6 is ('E0'), it is decided as an identifier of a video packet from the 1-byte signal SIG6. As shown in FIG. 11(a), the start code discrimination unit 2s5 posts the status updation signal to the start code status hold unit 2s14 by SIGX1, whereby the status is updated to the status "1" where one ('00') of the hierarchy start code of the coded video data is present. On the other hand, according to the value of the 1-byte signal SIG6 which is input by SIG9, the start code discrimination unit 2s5 sends the signal SIG9 to the formatter 2s13 to control the output data from the formatter 2s13. On receipt of the SIG9, the formatter 2s13 connects the switch SW2 to e to prepare for transferring the formatter output through the data separation control unit 2s8 to the decoding buffer 2s9. In this embodiment, the input status of the start code prefix detection unit 2s3 is the status "3" and the 1-byte signal SIG6 is ('E0'), i.e., ('00', '00', '01', 'E0'), and this corresponds to pattern E on Table (1) and, therefore, no formatter output is present. When the formatter 2s13 has completed formatting, it controls the controller 2s19 by using a format start/end signal SIG19 so that the switch SW2 is connected to none of the three terminals. The reason is as follows. Since the packet start code ('00', '00', '01', 'E0') is detected according to the SIG9, header analysis takes place after the format output process. A format output completion signal is posted as SIGX2 to the start code discrimination unit 2s5. On receipt of the SIGX2, the start code discrimination unit 2s5 activates the header analysis unit 2s6 with SIG11.

The status updation of the start code status hold unit 2s14 according to the SIGX1 depends on which part of the start code prefix is input to the decoding buffer 2s9 by the format operation. When one piece of ('00') is input, the status is updated to "1". When two or more pieces of ('00') are input, the status is updated to "2". When ('00', '00', '01') are input, the status is updated to "3". In other cases, the status is updated to "0".

| pattern | | input to start code prefix detection unit | output from formatter |
|---|---|---|---|
| A | | continuous three pieces of ('00') | ('00') |
| B | | ('00', 'XX') ('XX' is other than '00') | ('00', 'XX') |
| C | | ('00', '00', 'YY') ('YY' is other than '00', '01') | ('00', '00', 'YY') |
| D | 1 | ('00', '00', '01', 'zz') (('zz') is other than ('00'), ('b9'~'ff')) | ('00', '00', '01', 'zz') |
| | 2 | ('00', '00', '01', '00', 'zz') (('zz') is other than ('00'), ('b9'~'ff')) | ('00', '00', '01', '00', 'zz') |
| | 3 | ('00', '00', '01', '00', '00', 'XY') (('XY') is other than ('01')) | ('00', '00', '01', '00', '00', 'XY') |
| | 4 | ('00', '00', '01', '00', '00', '01', 'XY') (('XY') is ('b9'~'ff')) | ('00', '00', '01') |
| E | | ('00', '00', '01', 'YY') (('YY') is other than ('b9'~'ff')) | none |

In the case of FIG. 4(b), as in the case of FIG. 4(a), one piece of ('00') is output from the formatter 2s13 when ('00', '00') is input, and the status becomes "2". Even when the next ('00') is input to the start code prefix detection unit 2s3, one piece of ('00') is output from the formatter 2s13. To this point, ('00', '00') which is a part of the video hierarchy start code at addresses γ, δ is transferred to the decoding buffer 2s9. The operation when the subsequent ('01', 'E0') is input is identical to the case of FIG. 4(a). When ('E0') is input as a 1-byte signal SIG6 to the start code discrimination unit 2s5, since ('00', '00') is input to the decoding buffer 2s9, the status of the start code status hold unit 2s14 is updated from "3" to "2" by SIGX1.

Hereinafter, a further description will be given of the operation with respect to patterns of Table (1) other than patterns A and E.

In the case of pattern B, after the status "1" as shown in FIG. 10(b), one byte of data ('XX') having a value other than ('00') is input to the start code prefix detection unit 2s3. In this case, as shown in FIG. 11(c), it is decided that the code sequence ('00', 'XX') input to the start code prefix detection unit 2s3 is not a start code prefix and, therefore, the start code status hold unit 2s14 is updated from status "1" to status "0" according to a status updation signal SIG5. The start code status hold unit 2s14 whose status is updated controls the formatter 2s13 so that it outputs ('00', 'XX'), by using a status updation signal SIG8. The activated formatter 2s13 sends a format start signal SIG19 to the controller 2s19, and the controller 2s19 connects the switch SW2 to the terminal e, whereby ('00', 'XX') is output to the data separation control unit 2s8. When the formatter 2s13 completes the output, it sends a format end signal as SIG19 to the controller 2s19 to connect the switch SW2 to the terminal d. A formatter end signal SIG16 is sent to the start code prefix detection unit 2s3, and the start code prefix detection unit 2s3 resumes the operation in status "0".

In the case of pattern C, in the status "2" as shown in FIG. 10(c), ('YY') having a value other than ('00') and ('01') is input to the start code prefix detection unit 2s3. In this case, as shown in FIG. 11(c), it is decided that the code sequence ('00', '00', 'YY') input to the start code prefix detection unit 2s3 is not a start code prefix and, therefore, the start code status hold unit 2s14 is updated from status "2" to status "0" according to a status updation signal SIG5. The start code status hold unit 2a14 whose status is updated controls the formatter 2s13 so that it outputs ('00', '00', 'YY'), by using a status signal SIG8. The activated formatter 2s13 sends a format start signal SIG19 to the controller 2s19, and the controller 2s19 connects the switch SW2 to the terminal e, whereby ('00', '00', 'YY') is output to the data separation control unit 2s8. When the formatter 2s13 completes the output, it sends a format end signal as SIG19 to the controller 2s19, whereby the switch SW2 is connected to the terminal d. A formatter end signal SIG16 is sent to the start code prefix detection unit 2s3, and the start code prefix detection unit 2s3 resumes the operation in status "0".

In the case of pattern D-1, in the status "3" as shown in FIG. 10(e), ('YY') having a value other than ('00') and ('B9')~('ff') is input to the start code prefix detection unit 2s3. In this case, as shown in FIG. 11(c), it is decided that the code sequence ('00', '00', '01', 'zz') input to the start code prefix detection unit 2s3 is not a start code in reproduction unit and, therefore, the start code status hold unit 2s14 is updated from status "3" to status "0" according to a status updation signal SIG5. The start code status hold unit 2a14 whose status is updated controls the formatter 2s13 so that it outputs ('00', '00', '01', 'zz'), by using a status signal SIG8. The activated formatter 2s13 sends a format start signal SIG19 to the controller 2s19, and the controller 2s19 connects the switch SW2 to the terminal e, whereby ('00', '00', '01', 'zz') is output to the data separation control unit 2s8. When the formatter 2s13 completes the output, it sends a format end signal as SIG19 to the controller 2s19, whereby the switch SW2 is connected to the terminal d. A formatter end signal SIG16 is sent to the start code prefix detection unit 2s3, and the start code prefix detection unit 2s3 resumes the operation in status "0".

In the case of pattern D-2, in the status "3" as shown in FIG. 10(e), ('00') is input to the start code prefix detection unit 2s3. In this case, as shown in FIG. 11(d), 1-byte data is posted by SIG6 to the start code discrimination unit 2s5, and the start code discrimination unit 2s5 decides that there is a possibility that the input code sequence ('00', '00', '00', '01') is a start code in reproduction unit, and the start code status hold unit 2s14 is updated from status "3" to status "4" according to a status updation signal SIG5. In the status "4", when the start code discrimination unit 2s5 receives data ('zz') other than ('00') and ('B9')~('ff') as a further 1-byte signal SIG6 from the start code prefix detection unit 2s3, a status updation signal SIG5 is posted to the start code status hold unit 2s14, whereby the status of the start code status hold unit 2s14 is updated from "4" to "0". On the other hand, the formatter 2s13 is activated by the same status updation signal SIG5. The activated formatter 2s13 sends a format start signal SIG19 to the controller 2s19, and the controller 2s19 connects the switch SW2 to the terminal e, whereby ('00', '00', '01', '00', 'zz') is output to the data separation control unit 2s8. When the formatter 2s13 completes the output, it sends a format end signal as SIG19 to the controller 2s19, whereby the switch SW2 is connected to the terminal d. A formatter end signal SIG16 is sent to the start code prefix detection unit 2s3, and the start code prefix detection unit 2s3 resumes the operation in status "0".

Further, in the case of pattern D-3, when ('00') and ('XY') other than ('01') are continuously posted by STG6 in the status "4", the formatter 2s13 outputs ('00', '00', '01', '00', '00', 'XY').

Furthermore, in the case of D-4, when ('00', '00', '01') and ('XY') having a value from ('B9')~('ff') are continuously posted by SIG6 in the status "4", the formatter 2s13 outputs ('00', '00', '01'), and the status of the start code status hold unit 2s14 is updated from "4" to "3" according to SIGX1.

As described above, according to the first embodiment, the formatter 2s13 is provided, and when a code sequence which matches with a part ('00') at the head of a predetermined code sequence detected by the start start code prefix detection unit 2s3 is detected, the start start code prefix detection unit 2s3 detects the residual part ('00', '00', '01', 'E0') of the detected predetermined code sequence to detect a pattern of ('00', '00', '00'), and the formatter 2s13 outputs one piece of ('00'). After the boundary of packets is defined, amongst data which are not transmitted to the decoding buffer 2s9, data corresponding to code sequences other than the code sequence ('00', '00', '01', 'E0') indicating the packet boundary are output to the decoding buffer 2s9. Hence, when separating a coded and multiplexed signal, it is not necessary to perform complicated control such as advance and return of read addresses of the input buffer and, therefore, control of the read addresses of the input buffer by the input buffer reading control circuit is simplified and the hardware scale is reduced, thereby economically providing an apparatus performing reproduction of multiplexed digital code sequences.

Embodiment 2

Next, a description will be given of a coded signal reproduction apparatus according to a second embodiment of the present invention. In this second embodiment, in addition to the functions of the first embodiment, it is not necessary to hold a lot of reproduction information in the apparatus, and so hardware such as a memory required for holding the reproduction information can be minimized. Since the fundamental structure of this second embodiment is identical to that shown in FIG. 1, description thereof is omitted.

Figure 5:
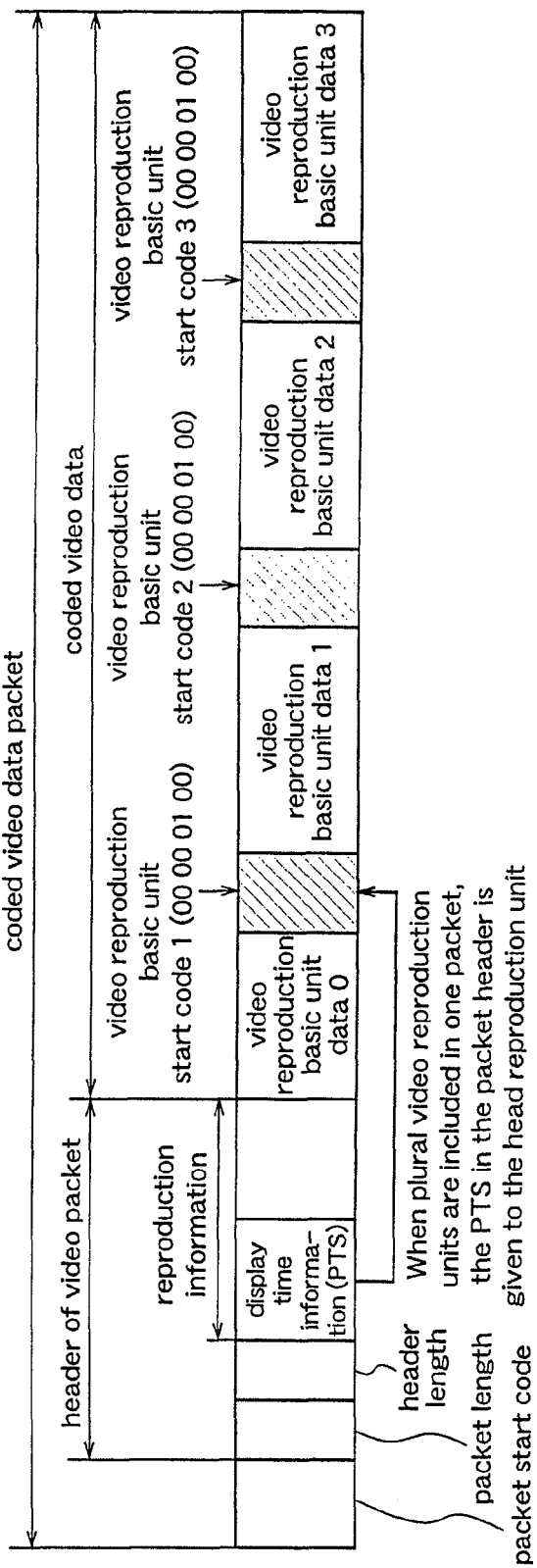
FIG. 5 is a diagram illustrating the relationship between a video packet and video reproduction units.

FIG. 5(a) illustrates a unit structure of a packet comprising a packet header of video and coded video data which follows the packet header. Coded video data included in a video packet includes a plurality of video reproduction fundamental units. In FIG. 5, video reproduction fundamental unit data 0~3 are included. Each video reproduction fundamental unit includes a video reproduction fundamental unit start code at its head. It is not assured that a video reproduction unit start code is always included in a video packet at the head of coded video data. As shown by the video reproduction fundamental unit data 0 of FIG. 5, generally, reproduction unit data which cannot be included in the previous video packet is positioned at the head of the coded video data. Display time information (PTS) is allocated to the fundamental unit data including the first video reproduction fundamental unit start code, amongst the video reproduction units included in the coded video data of the video packet. In the case of FIG. 5, the video reproduction fundamental unit data 1 corresponds to this. No display time information is allocated to other vide reproduction fundamental unit data. In case of a packet having no PTS, no PTS is allocated to any video reproduction fundamental unit data included in coded video data. Amongst reproduction information extracted in the header analysis unit 2s6, only information for performing synchronization of reproduction time between audio and video, which is called PTS, is temporarily stored in the reproduction information hold unit 2s7. When the header analysis unit 2s6 ends analysis of the header part, it activates the data separation control unit 2s8 to start transfer of the video data part toward the decoding buffer 2s9. At this time, in order to detect a boundary start code included in the coded video data, the start code prefix detection unit 2s3 which performs analysis of the packet header is activated.

When the start code prefix detection unit 2s3 detects a start code prefix code included in the video data, the start code prefix detection unit 2s3 activates the start code discrimination unit 2s5. The start code discrimination unit 2s5 refers to a code next to the detected prefix code of the boundary start code of the video data, and decides whether it is a boundary start code of the video data or a reproduction fundamental unit start code of the coded video data.

When the code that follows the start code prefix is decided as a reproduction fundamental unit start code, the formatter 2s13 outputs data obtained by adding the display start information (PTS) as reproduction information stored in the reproduction information hold unit 2s7, to the rear of the reproduction fundamental unit start code ('00', '00', '01', '00'), according to the analysis result of the start code discrimination unit 2s5. To be specific, as shown in FIG. 5(b), amongst the plural reproduction fundamental units included in the coded video data, the reproduction fundamental unit positioned at the head timewise is given a status flag and a PTS at the rear thereof, and a code indicating "effective" is given to the status flag. As for the subsequent reproduction fundamental units, since no PTS appears until the next packet header is detected, each of these units is given a status flag to which a flag indicating that the PTS is "ineffective" is given, and the PTS.

In this way, according to the second embodiment, the formatter 2s13 is provided, and only the PTS as time display information is captured in the reproduction information hold unit 2s7, amongst the reproduction information included in the packet header. A PTS is given to the rear of the video reproduction fundamental unit start code of each reproduction fundamental unit, and information (flag) indicating "ineffective" or "effective" is given to each of them. Hence, amongst the reproduction information included in the packet header, only the PTS is temporarily held in the reproduction apparatus, while data before decoding are held in the RAM (decoding buffer 2s9) outside the apparatus. Therefore, it is not necessary to hold a lot of reproduction information in the apparatus, and the scale of hardware such as a memory required for holding the reproduction information can be minimized, thereby economically providing an apparatus for reproducing multiplexed digital code sequences.

Although it is possible to add the extracted PTS to only the first reproduction fundamental unit without adding it to the subsequent reproduction fundamental units, the method of uniformly adding the PTS to each reproduction fundamental unit has an advantage in that the operation of the formatter is settled and so it can be easily controlled and, further, the routine at reproduction can be simplified.

Embodiment 3

Next, a description will be given of a coded signal reproduction apparatus according to a third embodiment of the present invention. In this third embodiment, in addition to the functions of the first embodiment, data are padded by using the formatter to simplify transfer control of a data bus through which data flow sequentially like a pipe line. Since the fundamental structure of this third embodiment is identical to that shown in FIG. 1, description thereof is omitted. In this third embodiment, the start code discrimination unit 2s5 implements an end code detection means for detecting a code sequence which indicates the end of coded data.

Figure 6:
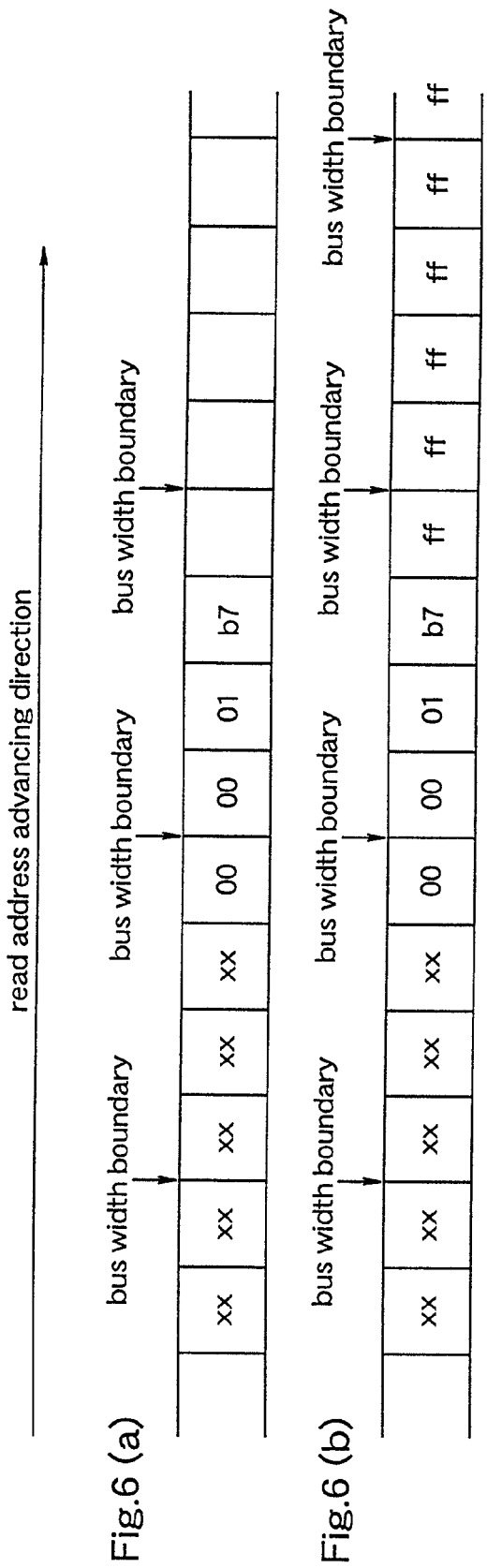
FIG. 6 is a diagram for explaining a padding process for an end part of coded video data by using a formatter.

FIG. 6(*a*) illustrates a pattern of a code sequence at the rear of coded video data, in coded and multiplexed data. As is evident from FIG. 6(*a*), the rear of the coded video data has a data pattern which is shorter than the data width of a pipe line output from the multiplexed signal separation unit 2s or the decoding unit 2s10. The start code prefix detection unit 2s3 detects a pattern of ('00', '00', '01') from the input data pattern, and the start code discrimination unit 2s5 decides a boundary start code ('00', '00', '01', 'b7') which indicates video end data. The ('b7') indicates a sequence end code. When the start code discrimination unit 2s5 detects the end part of the video end data as described above, it posts this to the formatter 2s13. Then, the formatter 2s13 generates video end data, adds data for padding ('FF') subsequently to the end data code sequence as shown in FIG. 6(*b*), and transfers these data to the decoding buffer 2s9. In the case where the byte width is 4 bytes (32 bits), three or more pieces of padding data are added subsequently to the end data code sequence, whereby data equivalent to the bus width including the video end data can be subjected to pipeline processing. To be specific, assuming that the width of a data bus for pipeline transfer is n bytes, when the video data of the end part is positioned at the m-th byte from the bus width boundary, (n-m) or more pieces of padding data are added, whereby the video data of the end part can be read by pipeline processing. By adding the padding data, the video end data part which has been shorter than the data bus width is aligned to the data bus width.

At this time, it is necessary to read, as padding data, data from the decoding buffer 2s9 and select data which does not make the decoding unit perform malfunction. For example, ('ff') which does not occur emulation with the start code prefix, is selected. To add the padding data to the end data sequence enables transfer of a code sequence including a code which is shorter than the data bus width of a pipe line required for decoding, without necessity of complicated data bus transfer control such as byte access.

By the way, in the case of coded video data, usually a code indicating the end of a program, which is called a program end code, is added to the end of a packet. However, addition of this code is not ensured in, for example, the existing MPEG standard. So, when description of this code is absent, the host CPU cannot decide as to whether data are transmitted to the last one to the decoding buffer or data transmission is interrupted, and this may cause a trouble such that the next image cannot be displayed during reproduction and so the system freezes. Further, when no sequence end code exists at the rear of coded video data, there may occur a drawback that the last several pieces of video cannot be output.

It is possible to deal with these cases by inserting a unique code sequence in the last packet of the packet sequence (or in the end of the sequence) in advance.

Figure 7:
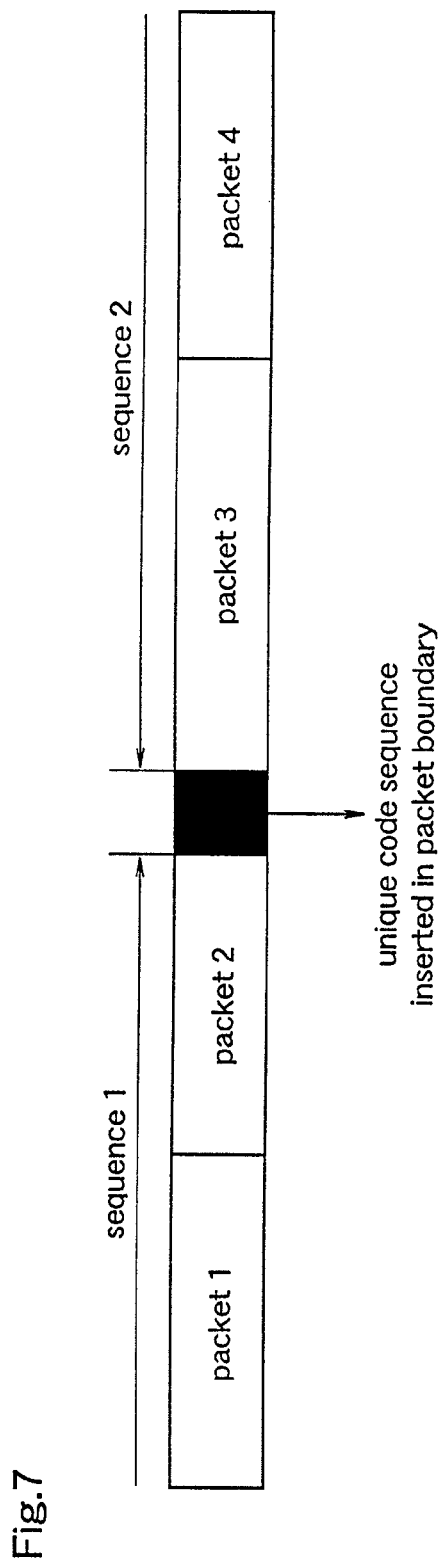
FIG. 7 is a diagram illustrating a unique code sequence inserted in coded and multiplexed data.

To be specific, FIG. 7 is a diagram illustrating a unique code sequence inserted in a packet boundary in a coded and multiplexed sequence. Assumed as a unique code sequence here is a code sequence similar to the packet start code. That is, the unique code sequence takes a pattern like ('00', '00', '01', 'XX'). However, selected as ('XX') is a code which is not confused with the packet start code, for example, a sequence end code ('b7') or a program end code ('b9'). Further, the host CPU 2s1 inserts the unique code sequence at the rear of packet data of a packet which is positioned at the rear of the reproduction sequence.

When a unique code sequence is input to the rear of a specific data packet by the host CPU 2s12, it is detected that unique code data is input, by the start code prefix detection unit 2s3 and the start code discrimination unit 2s5 in the multiplexed signal separation unit 2s. At this time, the start code discrimination unit 2s5 posts that coded data included in a packet previous to the unique code sequence should be transferred to the decoding buffer 2s9, to the data separation control unit 2s8 by using a post signal (SIG20).

On receipt of this signal, the data separation control unit 2s8 executes data transfer of the packet data to the decoding buffer 2s9, and when the transfer is completed, it posts the transfer completion to the start code discrimination unit 2s5 by using a post signal (SIG20). On receipt of the transfer completion, the start code discrimination unit 2s5 posts that the unique code sequence is detected and the data included in the packet previous to the unique code sequence is transferred to the decoding buffer 2s9, to the host CPU 2s12 by using a host control signal A (SIG13). Thereby, the external host CPU 2s12 can reliably detect that the specific packet data is stored in the decoding buffer 2s9.

Then, the specific coding sequence is identified in the coded data in which the specific coding sequence is inserted as described above, and a predetermined number of padding data are added after the coding sequence, whereby the sizes of data existing within the respective bus width boundaries can be made uniform. When a program end code has already been added to the last packet of the packet sequence, adding the specific code sequence results in that these are continuously detected, but this does not adversely affect the practical operation.

As described above, according to the third embodiment, the formatter 2s13 is provided with the data padding function, and padding data are added to the rear of a code sequence which is shorter than the data bus width of pipeline processing, whereby the sizes of data existing in the respective bus width boundaries are made uniform. Therefore, data transfer through the pipeline in the reproduction apparatus can be realized to the end part of coded data which is shorter than the data bus width in the pipeline, without requiring complicated transfer control. Thereby, reliable flow of the end part of the coded data through the pipeline of the reproduction apparatus can be realized without using complicated data transfer control.

Further, a specific code sequence is added to the last packet of the packet sequence. Thereby, when a signal of a specific data sequence is input, it is recognized as the input end of multiplexed data, and when the last specific code sequence is input, data previous to the input specific code sequence is transferred to the decoding buffer and, thereafter, detection of the specific code sequence is posted to the external host CPU, whereby the external CPU can surely detect that data of a specific packet is input to the decoding buffer. Thereafter, the CPU 2s12 clears the pipeline to initialize the decoding unit 2s10, whereby it can provide itself for the next coding.

Figure 8:
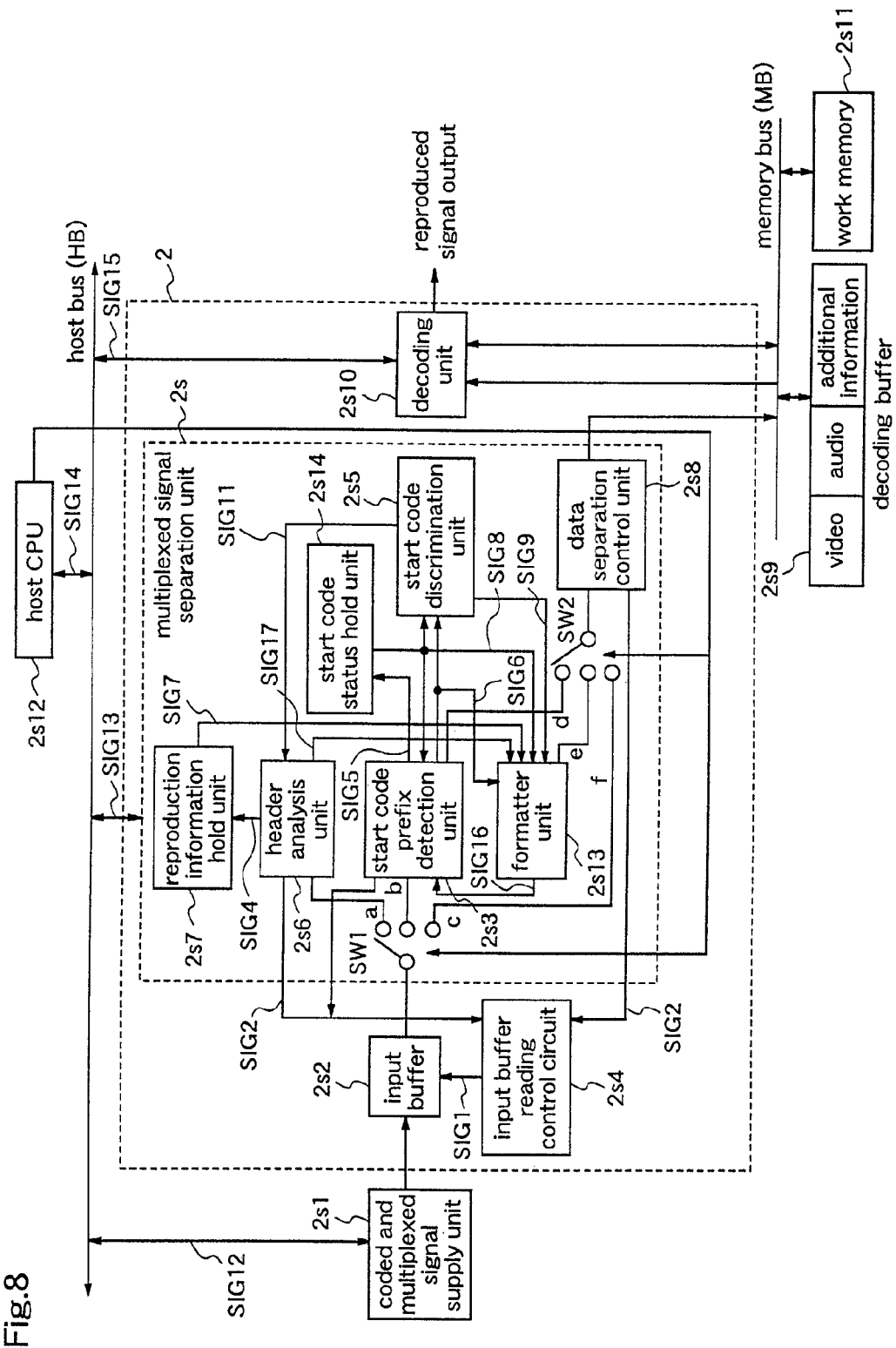
FIG. 8 is a block diagram illustrating a modification of a coded signal decoding apparatus according to first to third embodiments of the invention.

While in the first to third embodiments a controller is provided besides the host CPU, the controller may be omitted by making the host CPU have the function of controller as shown in FIG. 8, with the same effects as in the first to third embodiments.

APPLICABILITY IN INDUSTRY

The present invention relates to a coded signal reproduction apparatus and, more particularly, to simplification of circuit structure of an apparatus which performs reproduction of a digital code sequence in which audio, video, and other additional information are multiplexed, such as a video CD, a DVD, a digital CS broadcast, etc.

The invention claimed is:

1. A coded signal reproduction apparatus for reproducing coded data included in a plurality of packets, wherein a packet start code composed of fixed data which indicates a packet boundary to a subsequent packet is placed at a head portion of each packet, said coded signal reproduction apparatus comprising:
   a matching status information outputter configured to detect whether a sequence of input code is a part of the packet start code, and to output the detection result as matching status information; and
   a formatter configured to
      (i) output, when the sequence of input code is judged not to be a part of the packet start code but to be a part of a particular sequence of coded data, said part of the particular sequence of coded data in accordance with the matching status information output by said matching status information outputter, and
      (ii) not to output, when the sequence of input code is judged to be a part of the packet start code, said part of the packet start code,
   wherein the particular sequence of coded data and the packet start code have the same prefix code consisting of plural bytes,
   wherein said matching status information outputter includes a head code detection unit configured to receive the sequence of input code in units of a predetermined bit length, and to determine whether a current input code of the sequence of input code matches a current code of the packet start code,
   wherein said matching status information outputter includes:
   a matching status historical information hold unit configured to receive matching information indicating whether the current input code of the sequence of input code matches the current code of the packet start code from said head code detection unit, and to hold historical information indicating how many consecutive times the current input code of the sequence of input code matches the current code of the packet start code,
   wherein said head code detection unit identifies the current input code of the packet start code based on the historical information stored on said matching status historical information hold unit,
   wherein the coded signal reproduction apparatus further comprises:
   an end code sequence detector operable to detect, from code sequences of coded data, a code sequence indicating an end of the coded data, the code sequence indicating the end of the coded data being located at the end of the coded data;
   wherein said formatter is further configured to pad a data bus with a predetermined number of pseudo data so that the code sequence indicating the end of the coded data is forwarded to a next stage of a pipeline, when the code sequence indicating the end of the coded data is detected by said end code sequence detector, and
   wherein the coded data is transferred successively in a pipeline manner.

2. The coded signal reproduction apparatus as described in claim 1, further comprising a specific code sequence inserter operable to insert a specific code sequence in a last packet in a packet sequence before decoding,
   wherein said formatter is operable to add the predetermined number of pseudo data to a rear of the specific code sequence.

3. The coded signal reproduction apparatus as described in claim 1, wherein a sequence of the coded data is a coded and multiplexed signal in which audio, video, and reproduction information annexed thereto are multiplexed.

4. The coded signal reproduction apparatus as described in claim 1,
   wherein the end code sequence detector successively receives the code sequences of coded data and successively judges whether each of the received code sequences of the coded data is the code sequence indicating the end of the coded data, and
   wherein the code sequences of the coded data are transferred successively in the pipeline manner without adding the pseudo data when the received code sequences of the coded data are judged not to be the code sequence indicating the end of the coded data.

5. The coded signal reproduction apparatus as described in claim 1, wherein after the code sequence indicating the end of the coded data is transferred in the pipeline manner, remaining pseudo data is transferred successively in the pipeline manner.

* * * * *